U.S. Patent Number: 5,423,195
Date of Patent: Jun. 13, 1995

United States Patent [19]
Peters

[54] PORTABLE COOLER CHEST WITH PIVOTING WHEELS HAVING EXPANDED CIRCUMFERENTIAL ROLLING SURFACES

[76] Inventor: Calvin R. Peters, 351 N. Hardwick, SW., Grand Rapids, Mich. 49548

[21] Appl. No.: 145,159

[22] Filed: Nov. 3, 1993

Related U.S. Application Data

[60] Division of Ser. No. 926,583, Aug. 6, 1992, Pat. No. 5,285,656, which is a continuation-in-part of Ser. No. 845,477, Mar. 6, 1992, Pat. No. D. 340,620.

[51] Int. Cl.$^6$ ............................................. F25D 3/08
[52] U.S. Cl. .................. 62/457.7; 62/457.1; 270/694; 301/5.1; 301/40.1; 301/41.1; 280/38; 280/840; 280/651
[58] Field of Search .............. 62/457.1, 457.2, 457.5, 62/457.7, 457.9, 371, 372; 280/38, 840, 42, 651; 301/5.1, 13.1, 13.2, 36.1, 38, 40.1, 41.1; 220/890, 694

[56] References Cited

U.S. PATENT DOCUMENTS

| | | | |
|---|---|---|---|
| 2,018,527 | 10/1935 | Kerr | 280/38 |
| 2,419,445 | 4/1947 | Fletcher | 280/38 |
| 2,998,996 | 9/1961 | Aghnides | 301/41.1 |
| 3,347,060 | 10/1967 | Barkan | 220/666 |
| 3,591,194 | 7/1971 | Vega . | |
| 4,724,681 | 2/1988 | Bartholomew et al. . | |
| 4,846,493 | 7/1989 | Mason | 280/38 |
| 4,873,841 | 10/1989 | Bradshaw et al. . | |
| 5,038,953 | 8/1991 | Radar | 220/6 |
| 5,071,010 | 12/1991 | Carufel/Zeman . | |

FOREIGN PATENT DOCUMENTS

| | | |
|---|---|---|
| 1167298 | 2/1957 | France . |
| 590969 | 4/1959 | Italy . |
| 8900112 | 1/1989 | WIPO . |

Primary Examiner—John M. Sollecito
Attorney, Agent, or Firm—Warner Norcross & Judd

[57] ABSTRACT

A portable cooler chest is disclosed having a collapsible storage bin for nonperishable items and wheels specially adapted for rolling on sand or soft soils. The collapsible storage bin includes foldable side panels and may be integrated with or separable from the lid of the chest. A cover is provided to cover the erected storage bin, or to enclose the collapsed storage bin between the cover and the lid. Pivotable rolling surface segments are hinged to the wheels such that the segments may be pivoted outwardly to augment the width of the rolling surfaces. The wheels are rotatably connected to the lower extent of the enclosure by pivoting spindles. The wheels may be pivoted under the bottom of the enclosure to prevent rolling of the chest and to place the wheels out of the way. Stowable retainer disks maintain the segments in the outwardly pivoted position. The wheels may be removed from the chest.

5 Claims, 5 Drawing Sheets

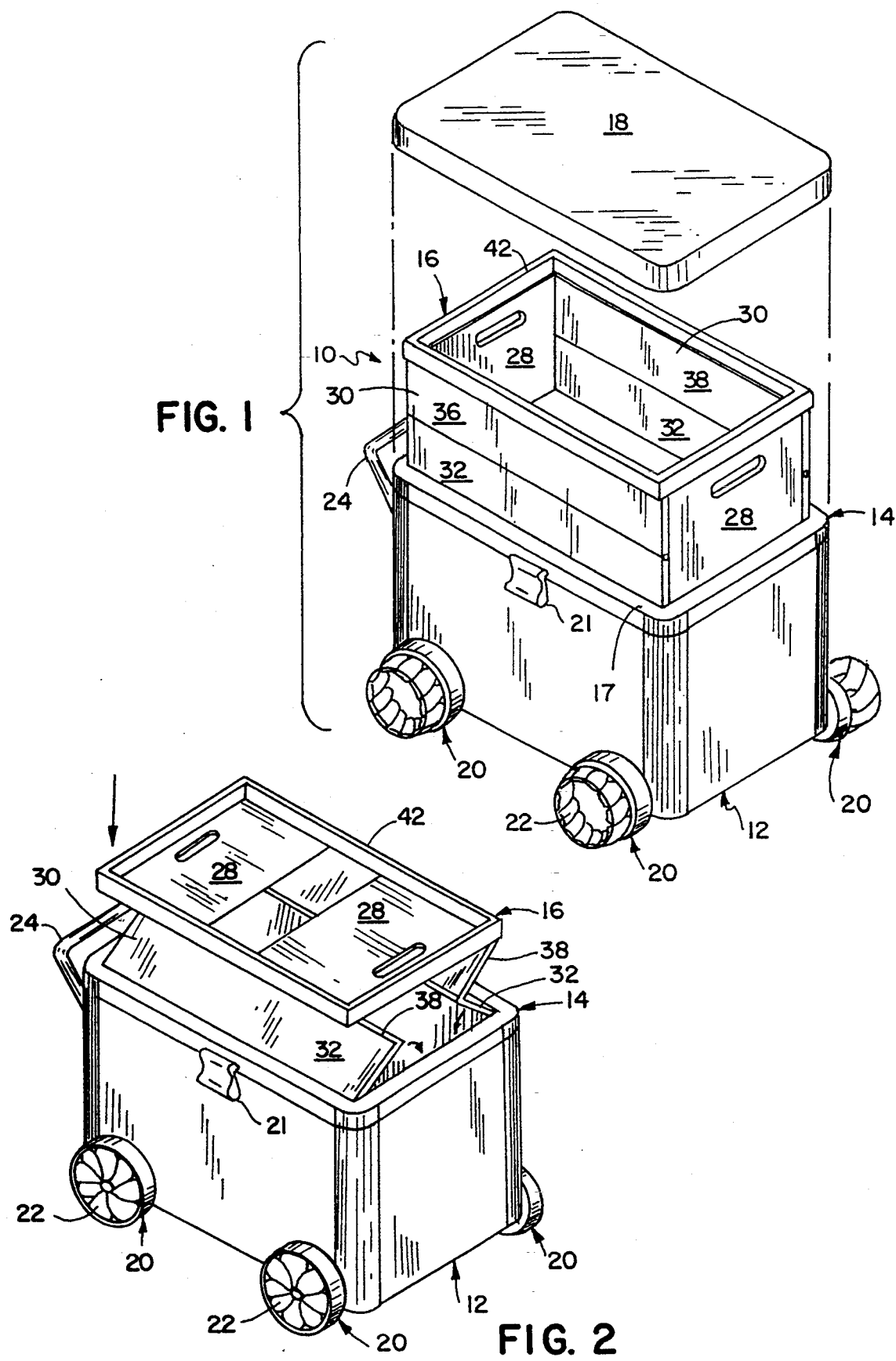

PORTABLE COOLER CHEST WITH PIVOTING WHEELS HAVING EXPANDED CIRCUMFERENTIAL ROLLING SURFACES

This is a division of application Ser. No. 07/926,583, filed Aug. 6, 1992 (now U.S. Pat. No. 5,285,656), which is a continuation-in-part of U.S. design patent application Ser. No. 845,477, filed Mar. 6, 1992 now U.S. Pat. No. 1,340,620.

BACKGROUND OF THE INVENTION

1. Field of the Invention

The present invention relates to a portable cooler chest and, more particularly, to a portable cooler chest having a collapsible storage bin integrated or included with the top of the cooler chest and expandable, retractable, removable, and pivotable wheels.

2. Description of the Related Art

Cooler chests are well known in which an open top, insulated enclosure is fitted with a lid. Such cooler chests are used to keep perishable food and beverage items hot or cold and to transport the food to a party, picnic, the beach, and many other places.

Large capacity cooler chests may become quite heavy when fully loaded with food, beverages, and ice. When so loaded, the cooler chest may be so heavy that two persons are required to lift and transport the cooler.

One approach to improving the transportability is to add wheels. However, if the cooler chest is to be transported to a sandy area, conventional wheels will tend to sink into the sand, thereby making it difficult or impossible to roll the cooler chest on its wheels. Also, the protruding wheels may be in the way once the cooler chest is brought to the site, and may also permit the cooler to continue to roll undesirably.

Furthermore, it is frequently desired to transport nonperishable items along with the perishable items in the cooler chest. Such items might include towels, plates, flatware, sports equipment, and the like. The transportation of these items adds inconvenience, and may require additional trips or persons to carry everything to the destination.

SUMMARY OF THE INVENTION

The present invention provides a cooler chest having wheels which are expandable to provide a larger rolling surface when the cooler chest is rolled across soft surfaces such as beach sand. The wheels are retractable to provide a narrower rolling surface for transportation across firmer ground and pavement. Furthermore, the wheels may be pivoted or folded under the cooler chest to prevent the chest from rolling and to stow the wheels out of the way. Additionally, the wheels may be easily removed from the cooler when rolling is not desired.

In a preferred embodiment of the invention, the wheels include interleaved segments which are hinged to the circumference of the wheels. To enable the wheels to be more effectively used on sand or soft soils, the segments are pivoted outward and thus add width to the rolling surface of the wheels. To retract the wheels, the segments are pivoted inwardly and stowed within the circumference of the wheels. A retainer disk is provided within each wheel for maintaining the wheel in the expanded position and for preventing the interleaved segments from undesirably pivoting outward when the wheels are retracted. The retainer disk is stowed within the wheel when the wheel is retracted. Furthermore, a flotation insert may be attached to the expanded wheel to maintain the wheel in the expanded position and to provide buoyancy.

In the preferred embodiment, each wheel includes a spindle which is socketed in a recess in the bottom extent of the cooler chest. The spindle may be pivoted downward and moved to a release position to allow the wheel to be removed from the cooler chest.

In another aspect, the present invention provides a collapsible storage bin integrated into or included with the top of the cooler chest. In a preferred embodiment, hinged side panels are attached to the lid of the cooler chest. The lid is recessed such that the side panels may be folded flat and received in the lid recess. A cover is provided which covers the top opening of the storage bin when it is erected and which covers the lid and the folded storage bin when it is collapsed.

These and other objects, advantages, and features of the present invention will be more fully understood and appreciated by reference to the written specification and appended drawings.

BRIEF DESCRIPTION OF THE DRAWINGS

FIG. 1 is a perspective view of a portable cooler chest according to the principles of the invention with the wheels expanded, the storage bin erected, and the cover in exploded relationship;

FIG. 2 is a perspective view of the portable cooler chest of FIG. 1 with the wheels retracted and the storage bin partially collapsed.

DESCRIPTION OF THE PREFERRED EMBODIMENT

Figure 3:
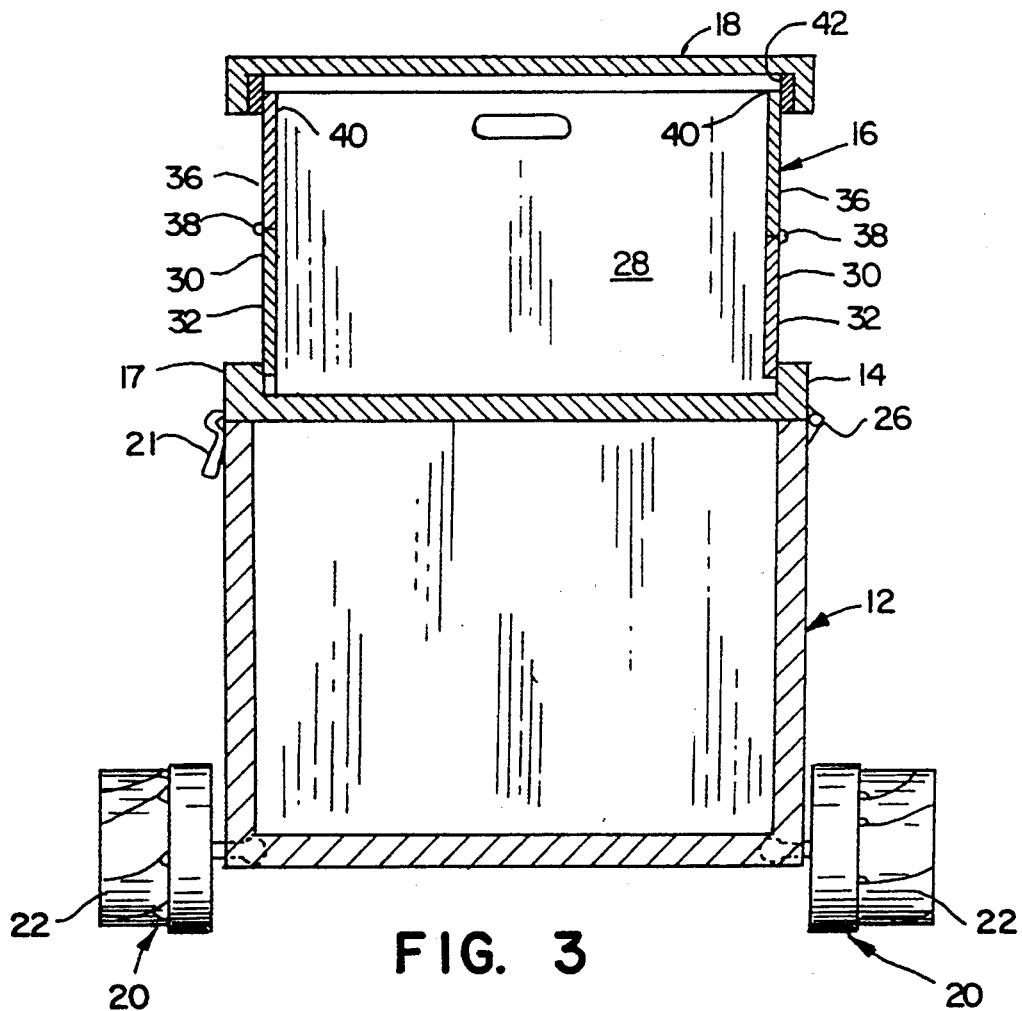
FIG. 3 is a vertical, end, sectional view of the portable cooler of FIG. 1 with the cover in place.

By way of disclosing a preferred embodiment, and not by way of limitation, there is shown in FIG. 1 a portable cooler chest 10 which includes in its general organization an open topped, generally rectangular enclosure 12, a lid 14, an open topped, generally rectangular collapsible storage bin 16 integrated with the lid 14, a cover 18, four wheels 20 disposed alongside the lower extent of the enclosure at the front and rear thereof, a latch 21, and, optionally, a handle 24. The collapsible storage container 16 is shown in an erected position in which the collapsible storage container extends upwardly from the lid 14. The wheels 20 are shown in an expanded state in which the width of the wheels is augmented by wheel segments 22 being pivoted outwardly.

Preferably, the components of the portable cooler chest are made of molded plastic, although other materials are suitable as will be readily appreciated by those skilled in the art. The walls of the portable cooler chest enclosure 12 and lid 14 are insulated in a conventional manner.

Figure 12:
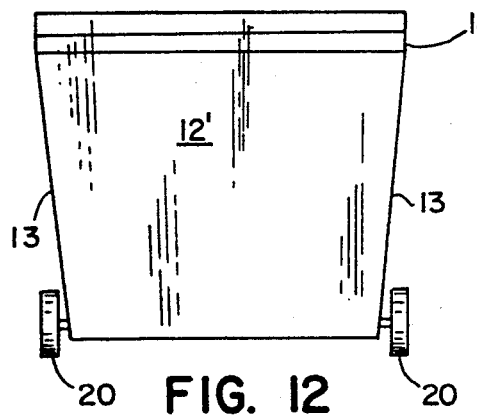
FIG. 12 is an end view of a third alternate embodiment of the portable cooler chest.

As shown in FIG. 12, the cooler chest enclosure 12' may be formed such that side walls 13 taper inwardly and downwardly. The degree of taper is selected such that wheels 20, when retracted and pivoted outwardly, do not extend outwardly beyond the maximum width of the cooler chest as defined by the cover 18 or any other component defining the overall width of the cooler chest. In this manner, the use of the wheels does not increase the width of the cooler chest.

Referring to FIGS. 1 and 3, it may be seen that the lid 14 is coextensive with the top opening of the enclosure 12. The lid 14 is attached to the enclosure 12 by hinge 26 situated opposite the latch 21. Thus, the interior of the enclosure 12 may be accessed by releasing the latch and pivoting the lid upwardly.

Collapsible storage container 16 is integral with lid 14 and includes opposed, spaced apart end walls 28, and opposed, spaced apart side walls 30 which extend between the end walls. The side walls 30, end walls 28, and the lid 14 cooperate to form an open topped receptacle for the storage and transport of nonperishable items.

Lid 14 is formed with a central recess 15 bounded by a perimeter wall 17. Each side wall 30 includes a lower panel 32 hinged at 34 to a side portion of the perimeter wall 17 of the lid. Each side wall 30 further includes an upper panel 36 with its lower edge hinged at 38 to the upper edge of the corresponding lower panel 32. The upper edge of each upper side wall 36 is hinged at 40 to the side portions of a rectangular frame 42 which surrounds the top opening of the collapsible storage container. Each of the end panels 28 is hinged at its upper edge to the end portions of the frame 42. The frame 42 thus maintains the side and end walls in rectangular relationship.

Figure 4:
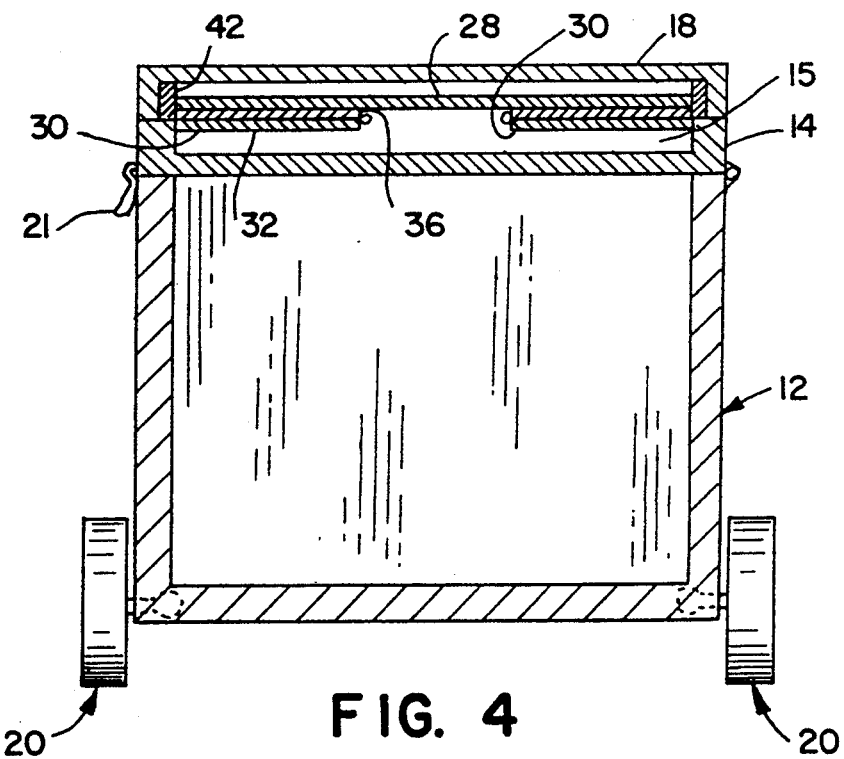
FIG. 4 is a vertical, end sectional view of the portable cooler chest of FIG. 3 with the wheels retracted and the storage bin collapsed.

As shown in FIG. 2, the collapsible storage container 16 is collapsed by first pivoting the end walls 28 inward and upward. When the end walls 28 clear the side walls 30, the upper and lower panels 32, 38 of the side walls are pivoted inwardly, thus allowing the frame 42 to be moved downwardly toward the lid 14. As shown in FIG. 4, when the collapsible storage container is fully collapsed, the upper panels 36 are folded against the lower panels 32, and are received within the recess 15 of the lid 14. The end panels 28 lie above the folded side walls 30 beneath the cover 18. Thus, when collapsed, the storage bin lies substantially flat on the lid and enclosed between the cover 18 and the lid.

To erect the collapsible storage container, the cover 18 is removed and the frame 42 is raised until the side walls are vertical and unfolded. The end walls 28 then pivot downwardly into a vertical position.

Figure 13:
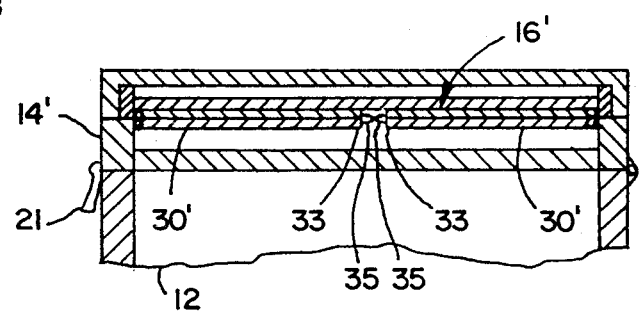
FIG. 13 is a fragmentary sectional view similar to FIG. 4 but showing an alternate arrangement of the storage bin.

FIG. 13 shows an alternate construction of the collapsible storage container 16' in which the collapsible storage container is dimensioned such that the hinged edges 33 of the folded panels of the side walls 30' meet along the centerline of the lid 14'. The hinged edges 33 are fitted with resilient strips 35 which fit tightly against one another to form a seal. Preferably, the panels of the side walls 30' are made of insulative material. Thus, when folded, the side walls 30' provide an additional thickness of insulation for the top of the cooler chest.

Figure 14:
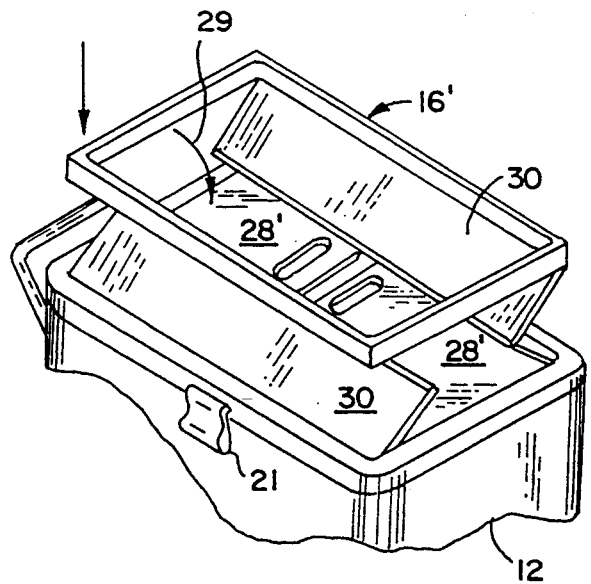
FIG. 14 is a fragmentary sectional view similar to FIG. 2 but showing a second alternate arrangement of the storage bin.

FIG. 14 shows an alternate folding arrangement for the collapsible storage container 16''. In this arrangement, the end walls 28' are hinged along their bottom edges. The storage container 16'' is collapsed by first folding the end walls 28' downwardly as indicated by arrow 29. When fully collapsed, the end walls 28' lie flat beneath the folded side walls 30.

As shown in FIG. 3, the wheels 20 of the portable cooler chest have an expanded position in which the interleaved segments 22 are pivoted outwardly, thus augmenting the width of the wheels such that the portable cooler chest may be rolled over soft soil such as beach sand without penetrating into the sand. As shown in FIG. 4, the wheels 20 further have a retracted position in which the interleaved segments 22 are pivoted inwardly, overlying one another within the rim, thus reducing the width of the wheels for use on firm soil or pavement.

Further details of the construction of the wheels 20 are shown in FIGS. 5–8.

Figure 5:
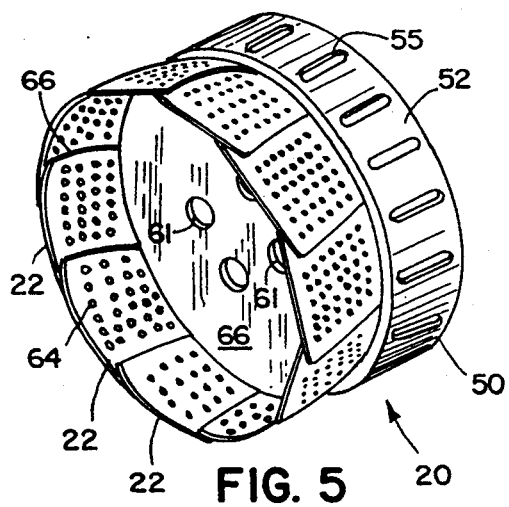
FIG. 5 is an enlarged perspective view of an expanded wheel.
Figure 6:
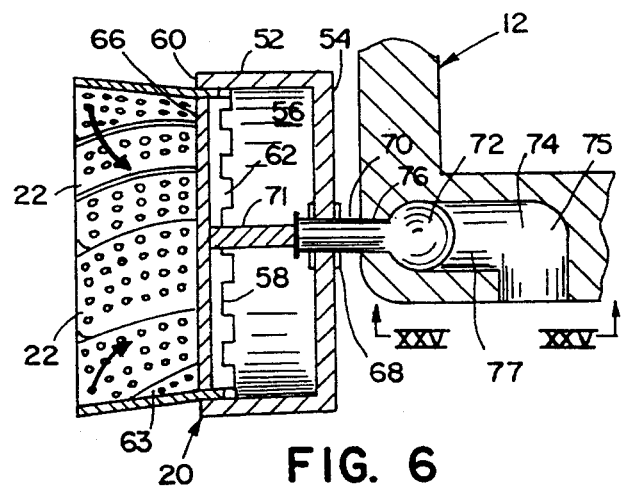
FIG. 6 is a fragmentary, vertical, sectional view of an expanded wheel and the adjacent portion of the cooler chest enclosure.

As shown in FIGS. 5 and 6, each wheel includes a generally cylindrical rim 50 having a outer circumferential rolling surface 52 and a circular hub wall 54. The inner circumferential wall 56 of the wheel is formed with a number of circumferentially spaced apart hinge elements 58 spaced inwardly from the outer edge 60 of the rim 50. The rolling surface 52 is formed with regularly spaced slotted openings 55 which allow sand or soil to escape from the interior of the wheel.

Each wheel further includes a number of interleaved wheel segments 22. Each segment 22 includes a hinge element 62 extending between the hinge elements 58 the rim 50 and hinged thereto by suitable means such that the segment may be pivoted inwardly toward the center of the rim for stowage, or outwardly away from the outer edge 60 of the rim.

Figure 7:
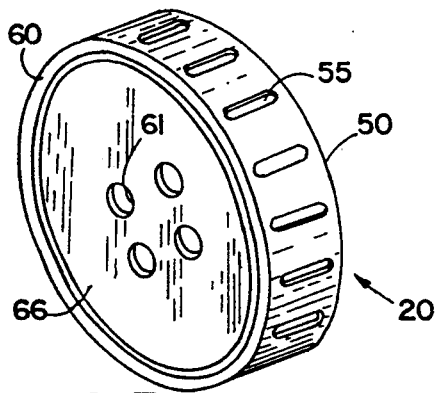
FIG. 7 is an enlarged perspective view of a retracted wheel with the retainer disk in place.
Figure 7A:
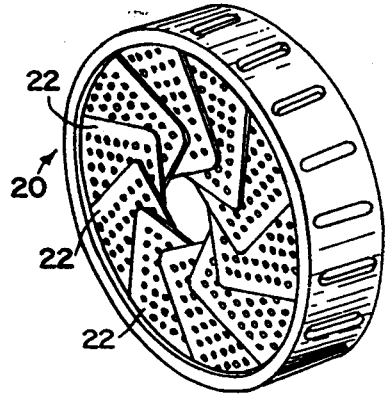
FIG. 7A is similar to FIG. 7 but with the retainer disk removed.

As best shown in FIGS. 5 and 7A, the segments are interleaved and overlapping such that the leading portion of one segment extends over the trailing portion of an adjacent segment. The wheel may be expanded by pivoting all of the segments 22 outwardly into the position shown in FIGS. 5 and 6. The wheel may be retracted by pivoting all of the segments inwardly into the position shown in FIGS. 7, 7A and 8. When expanded, the segments 22 cooperatively form an additional width of substantially cylindrical rolling surface. Preferably, the segments 22 are formed with perforations 64 which allow sand to escape from the interior of the wheel.

As shown in FIGS. 5 and 6, a retainer disk 66 is placed within the wheel 20 such that its outer circumferential edge presses outwardly against the inner circumference defined by the segments 22 when the wheel is expanded. Retainer disk 66 is formed with finger holes 61 or other suitable means by which the retainer disk may be grasped for inserting and removing. In this position, the retainer disk resists the forces against the augmented width of the wheel and maintains the segments in a cylindrical configuration.

As shown in FIG. 6, the center of the inner surface of the retainer disk 66 is formed with an axially protruding shaft 71. The wheel rotates about a spindle 70 which has a recess 73 formed in its end. The end of the shaft 71 snap-fits into the recess 73 of the spindle. To expand the wheel, the segments are pivoted outwardly, then the disk is inserted into the wheel until the shaft 71 snaps into the spindle recess 73.

Other means for removably attaching the retaining disk 66 to the wheel are within the scope of the invention. For example, the shaft 71 and the recess 73 may be threaded and tapped for a screw connection. As a further example, outer center of the retainer disk may be provided with a push button which engages or releases a spring loaded interlock between the shaft 71 and the spindle 70.

Figure 8:
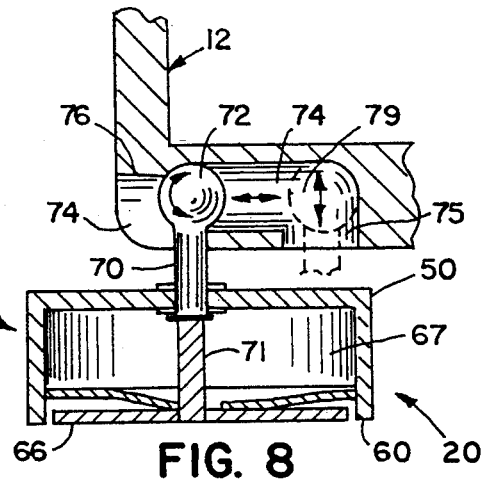
FIG. 8 is a fragmentary, vertical, sectional view of a retracted wheel and the adjacent portion of the cooler chest enclosure with the wheel pivoted under the cooler chest enclosure.

To collapse the wheel, the retainer disk is pulled out and the segments are pivoted inwardly into the position shown in FIG. 7A. The shaft 71 of the retainer disk 66 is inserted in the central opening 81 surrounded by the folded segments 22 until the shaft snaps into the recess 73 at the end of the spindle. When thus collapsed, as shown in FIGS. 7 and 8, the segments 22 lie within the recess 67 within the wheel 20 behind the retainer disk 66. Preferably, the wheel components are dimensioned such that the outer surface of the retainer disk 66 lies substantially flush with the outer rim 60 of the wheel. In this position, the retainer disk prevents the segments from pivoting outwardly, hides the segments from view, and provides a barrier against the entry of sand or soil into the wheel. Also, the retainer disk is safely stowed and available for use when the wheel is again expanded.

Figure 15:
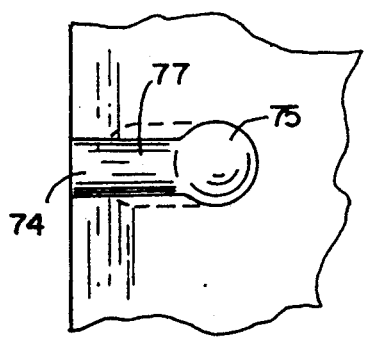
FIG. 15 is a fragmentary bottom view of the cooler chest taken along the line XXV—XXV of FIG. 6 and showing the wheel spindle recess.

As shown in FIG. 6, each wheel is rotatably mounted by a suitable journal or bushing 68 to spindle 70. The end of the spindle opposite the wheel is formed with an enlarged spherical head 72. The spherical head 72 is received within a recess 74 formed within the bottom extent of the cooler chest enclosure 12. Referring also to FIG. 15, the recess 74 opens downwardly and to the side. The recess has an enlarged portion 75 disposed inwardly from the side wall of the enclosure and a narrowed portion 77 disposed outwardly and adjacent the side wall of the enclosure. The recess is dimensioned such that, when the wheel is in the rolling position as shown in FIG. 6, the spherical head 72 is captured within the narrowed portion 77 of the recess with the spindle 70 contacting the upper wall 76 of the recess. The length of the spindle 70 is formed so as to prevent the spherical head 72 from being withdrawn into the enlarged portion 75 of the recess when the wheel is in the rolling position.

Figure 9:
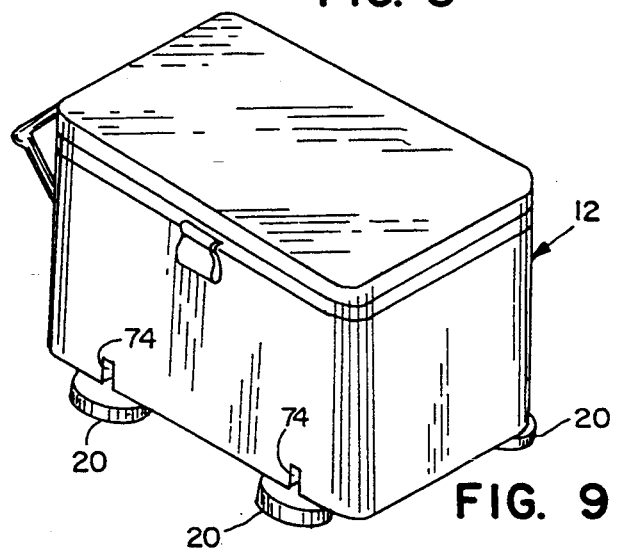
FIG. 9 is a perspective view of the portable cooler chest with the storage bin collapsed, the cover in place, and the wheels retracted and pivoted under the cooler chest enclosure.

As shown in FIGS. 8 and 9, the wheels may be folded or pivoted under the enclosure 12 by pivoting the retracted wheels downwardly. When so folded, the wheels are unable to roll and are stowed out of the way.

As shown in FIG. 8, the folded wheels may be removed by first sliding the wheels inwardly until the spherical head of the spindle is within the enlarged portion 75 of the recess as indicated at 79. The wheels are then removed by pulling the spindles downwardly out of the recess. The wheels may be reinstalled by reversing the procedure. If desired, the spindles and recesses 74 may be dimensioned so that the spindles are snap-fit within the recesses.

Other means of pivotably attaching the wheel spindles to the enclosure are within the scope of the invention and will be readily apparent to those skilled in the art. For example, the spindle may attached by pivot pins extending through the ends of the spindles and into the bottom of the enclosure.

Figure 10:
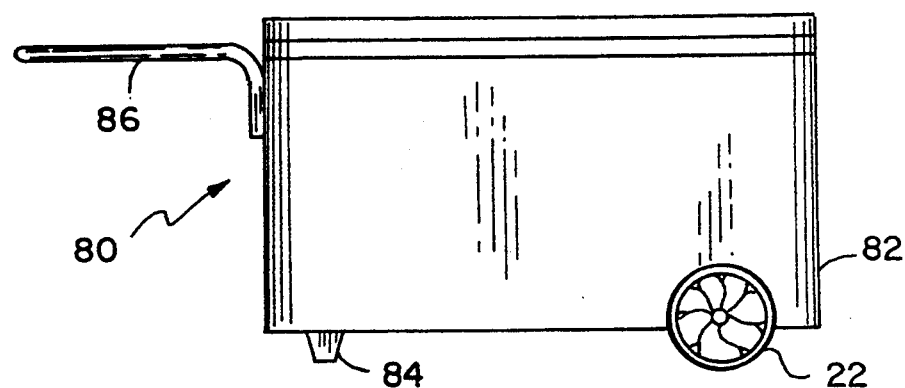
FIG. 10 is a perspective view of an alternate embodiment of the portable cooler chest.

An alternate embodiment of the portable cooler chest 80 is shown in FIG. 10. This embodiment is similar to the embodiment of FIG. 1 except that only two wheels 22 are used at the front of the enclosure 82. The underside of the rear of the enclosure is formed with feet 84. The portable cooler chest is rolled by lifting the handle 86.

Figure 11:
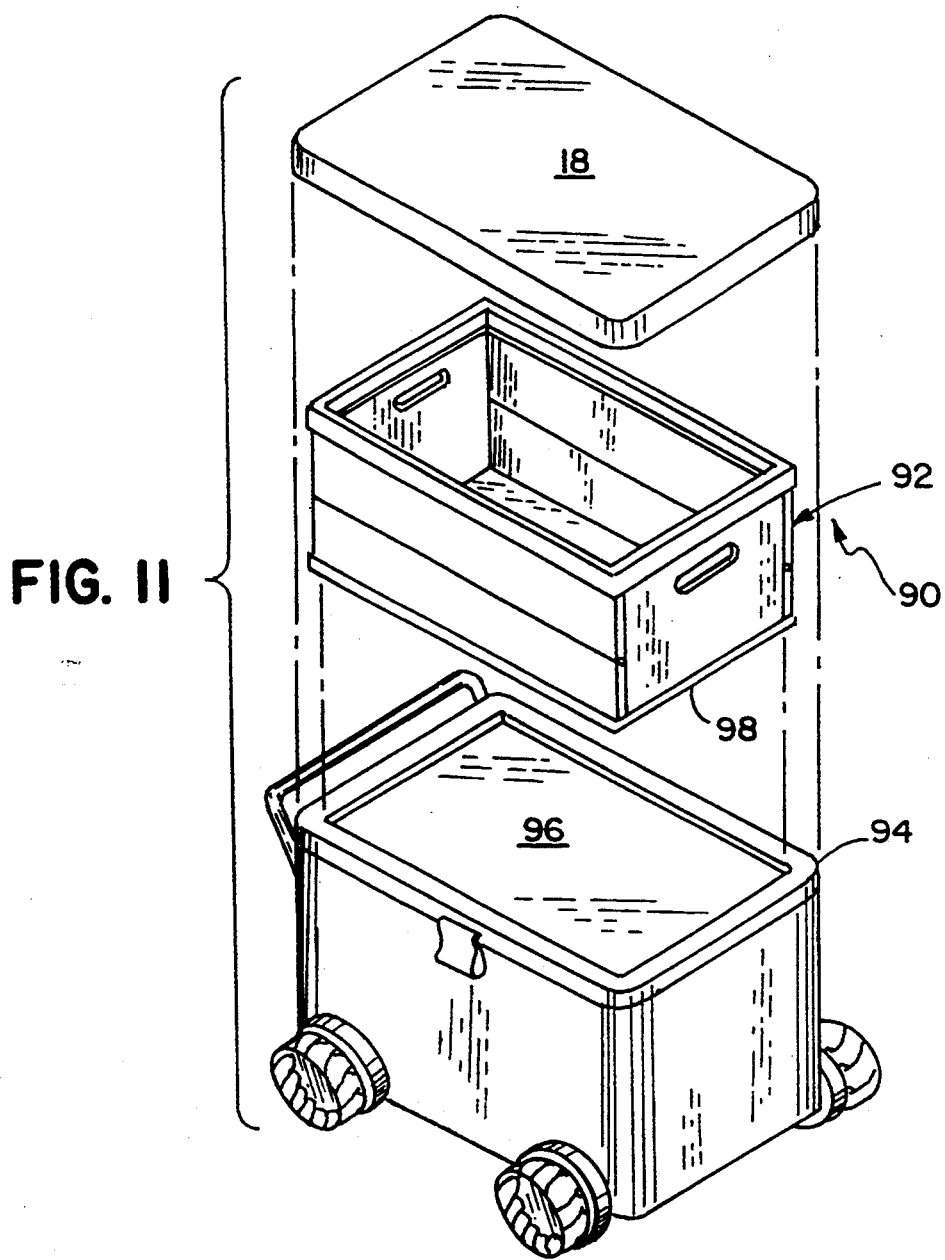
FIG. 11 is a perspective view of a second alternate embodiment of the portable cooler chest.

A further alternate embodiment of the portable cooler chest 90 is shown in FIG. 11. This embodiment is similar to the embodiment of FIG. 1 except that the collapsible storage container 92 is separable from the lid 94. The lid 94 is formed with a central recess 96, and the collapsible storage container includes a bottom panel 98 which fits within the recess. The collapsible storage container collapses in the same manner described above and may be stowed between the lid 94 and the cover 18.

Figure 16:
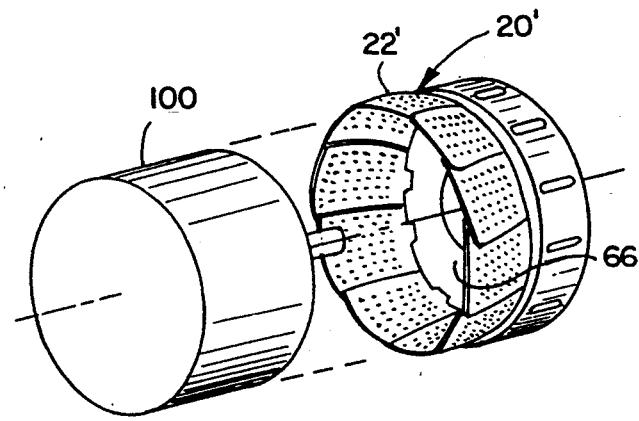
FIG. 16 is a exploded view of a wheel and a flotation insert.
Figure 17:
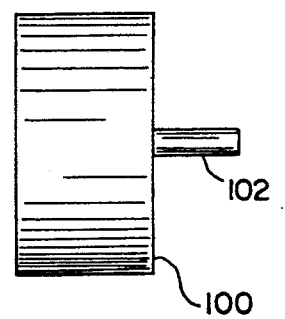
FIG. 17 is a side view of the flotation insert.

An alternate wheel construction is shown in FIG. 16. In this embodiment, a flotation insert 100 is received within the interior of each wheel 20'. Each flotation insert 100 is generally cylindrical and formed of buoyant material such as a foam material. The flotation insert is sized to fit snugly within the interior 67 of the wheel. The flotation insert thus maintains the segments 22' in the expanded position and aids in keeping the cooler chest afloat in the event the cooler chest is intentionally or accidentally placed in water. As shown in FIG. 17, the flotation insert 100 is provided with a central shaft 102 which is snap-fit into the recess at the end of the spindle 70 in the same manner as the shaft of the retaining disk as shown in FIG. 6.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A portable cooler chest comprising:
   an open topped, insulated enclosure;
   a lid removably covering the open top of said enclosure;
   a plurality of wheels rotatably connected to the lower extent of said enclosure, said wheels being movable between a rolling position in which said wheels are disposed alongside the lower extent of said enclosure and a nonrolling position in which said wheels are disposed beneath said enclosure, each of said wheels including a spindle interconnecting said wheel to said enclosure, said spindle having an end opposite said wheel pivotably connected to said enclosure, wherein said end of said spindle opposite said wheel is formed with an enlarged head and the adjacent lower extent of said enclosure is formed with a recess, said head being pivotally received within said recess.

2. The portable cooler chest of claim 1 wherein said recess is formed opening outwardly toward the side of said enclosure and downwardly.

3. The portable cooler chest of claim 2 wherein said recess includes an outwardly disposed narrowed portion and an inwardly disposed enlarged portion, said spindle being movable between a first position in which said enlarged head is retained within said narrowed portion and a second portion in which said enlarged head is removably disposed within said enlarged portion.

4. A portable cooler chest comprising:
an open topped, insulated enclosure;
a lid removably covering the open top of said enclosure;
a plurality of wheels rotatably connected to the lower extent of said enclosure, said wheels being movable between a rolling position in which said wheels are disposed alongside the lower extent of said enclosure and a nonrolling position in which said wheels are disposed beneath said enclosure,
wherein each of said wheels includes a circumferential rolling surface expandable to an increased width and retractable to a narrowed width.

5. The portable cooler chest of claim 4 wherein the maximum width of said portable cooler chest is defined by said enclosure, and wherein said wheels when in said rolling position do not extend beyond said maximum width.

* * * * *